Feb. 20, 1934.    E. S. PRINCE    1,947,571
ICE CREAM CABINET
Filed April 24, 1933
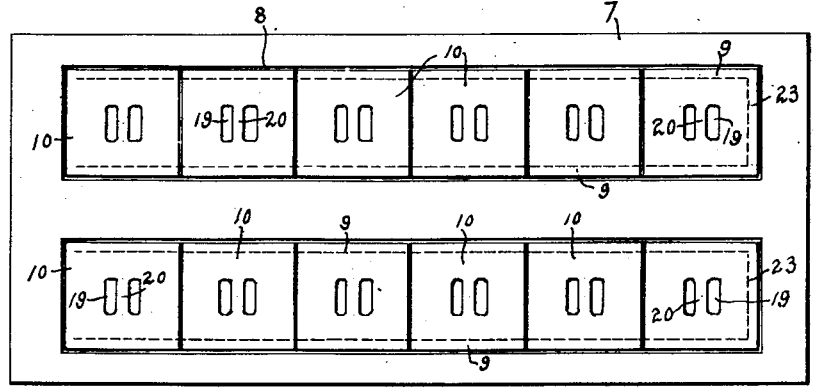
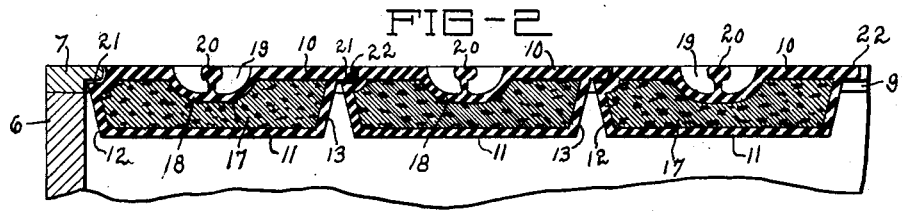
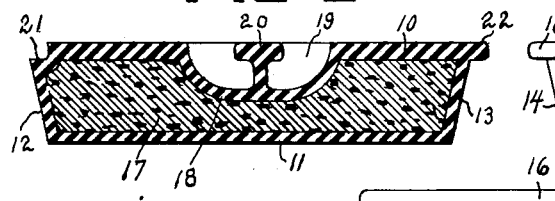  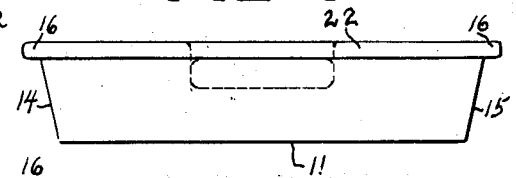
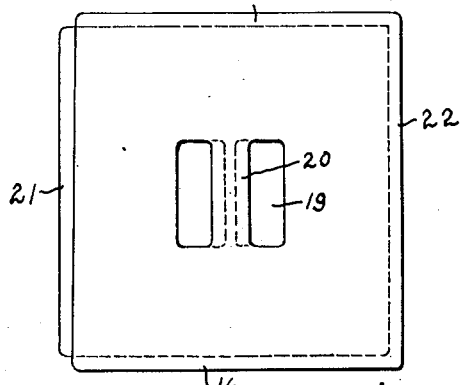
INVENTOR.
Earl S. Prince,
BY Walter N. Haskell.
ATTORNEY.

Patented Feb. 20, 1934

1,947,571

UNITED STATES PATENT OFFICE 1,947,571

ICE CREAM CABINET

Earl S. Prince, Sterling, Ill.

Application April 24, 1933. Serial No. 667,675

1 Claim. (Cl. 220—24)

My invention has reference to ice cream cabinets, such as are made use of in confectionary stores and similar establishments to keep ice cream, ice cream bricks, and similar products in a chilled condition. The chief purpose thereof is to increase the efficiency and facility of operation of such devices, and it has to do more especially with the construction of the upper part of the cabinet, with the openings therein, and closures for said openings. These openings are formed continuously, with the closures consisting of sectional units. Each section is of insulated formation, and all of the sections of a series have an interconnecting relation with each other, and can be used interchangeably in any part of the opening. This interconnection is such as to form a perfect seal at the joints between the sections, and at the ends and sides thereof, and aid in preventing the access of warm air to the cabinet through the top, or the escape of cold air therefrom.

Another purpose of the invention is to form each of the units of vulcanized rubber or similar material, with the top and bottom plates and side walls of each unit integrally formed, and with a central space or chamber containing the insulation, all of said parts comprising a monolithic block or unit. In practice, the insulating material is first formed in the desired shape and used as a core, upon and about which the rubber material is molded.

The above named, and other features and advantages of the invention will more fully appear from the following specification, taken in connection with the accompanying drawing, in which:—

Fig. 1 is a plan view of an ice cream cabinet equipped with the invention.

Fig. 2 is a longitudinal section through several of the closure units, with a fragmentary part of the cabinet.

Fig. 3 shows one of said units in similar section, somewhat enlarged.

Fig. 4 shows one of said units in end view.

Fig. 5 is a plan view thereof.

The reference number 6 indicates a portion of the upper part of a cabinet, having a top 7, in which are continuous openings 8, of rectangular formation. Supported just below the sides of said openings, for the length thereof, are strips 9, for the support of the closure units. Each of said units is of rectangular form, and has a top plate 10, a bottom plate 11, integrally united by end walls 12 and 13, converging downwardly, and side walls 14 and 15, similarly converging. The cover 10 is provided at its sides with flanges 22, fitting within the sides of the opening 8, and slidable on the strips 9. Said flanges have a close contact with the strips, and have a sealing effect along the sides of the opening. Within the unit is a space containing insulating material, as indicated at 17, which insulation is preferably formed of granulated cork or other cork product, adding lightness to the unit.

At its central part the cover 10 is depressed, as shown at 18, forming a cavity 19, transversely of which is a handle 20, also formed of rubber, and integrally with the cover. Said handle possesses a limited degree of flexibility, and is more agreeable to the touch than handles of harder material. By means of the handle the cover can be removed or replaced, and by reason of the handle being flush with the upper face of the cover one of the units can be placed on one of the other units without interference.

Each of the units is provided at one of its ends with a recess 21, and the opposite end with a flange 22, the flange of one unit interconnecting with the recess of the adjacent unit, as shown in Fig. 2. The flanges 22 are formed with a limited amount of flexibility, and engage tightly with the bottom of the recess of the adjacent unit, forming a seal at the joint between said units, with the covers extending continuously from one end of the opening to the other. The channel 21 in the unit at one end of the series is underlapped beneath the edge of the opening 8, and the flange 22 at the opposite end fo the series is engaged with a cross-strip 23.

To remove one of the units it must be inclined slightly, and the sloping walls of the unit favor this movement. When one of the units has been removed, to provide access to the cabinet, other parts of the top can be opened, if desired, by sliding others of the sections along the strips 9, and finally replacing the section first removed in the last opening.

As hereinbefore stated, the outer portion of the units is formed of vulcanized rubber, and the preferred method of producing the same is to first provide the insulated central block 17, and then surround the same with the rubber casing by means of a suitable mold, following which the device is submitted to a vulcanizing process.

What I claim and desire to secure, is:—

In a refrigerating cabinet, having an elongated opening in its top, a sectional closure for said opening, comprising a hard rubber casing provided with a non-projecting handle, said casing being formed integrally of a cover-plate, provided with supporting means, and having at one end a recess, and at the other end a flange of similar contour, a bottom plate, and connecting end and side plates, and an insulator filling for said casing.

EARL S. PRINCE.